Patented Jan. 30, 1923.

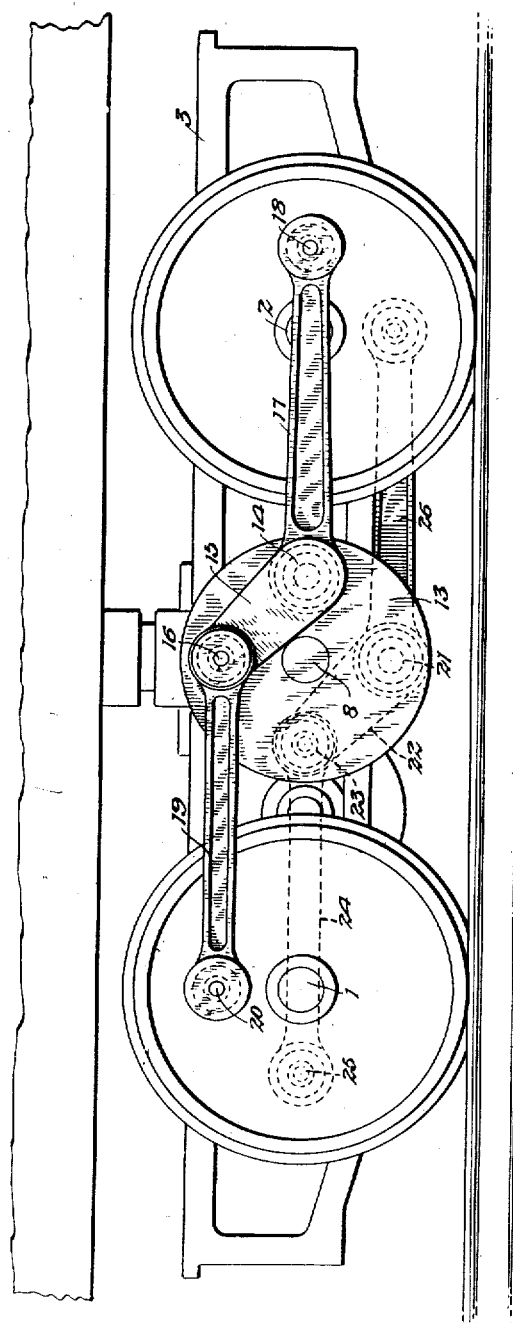

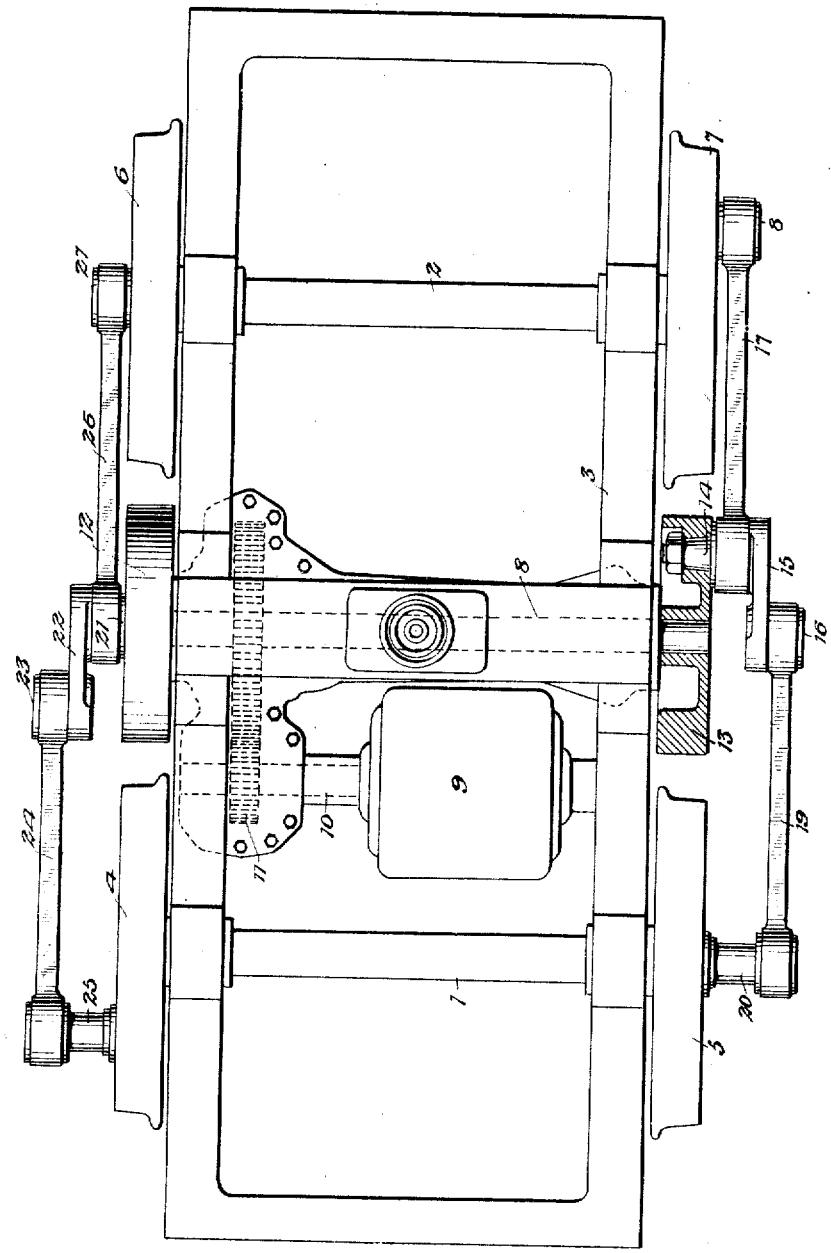

1,443,472

UNITED STATES PATENT OFFICE.

HAROLD LOUIS HAMILTON, OF CLEVELAND, OHIO, ASSIGNOR TO THE ELECTROMOTIVE ENGINEERING COMPANY, OF CLEVELAND, OHIO, A CORPORATION OF OHIO.

POWER TRANSMISSION.

Application filed March 7, 1922. Serial No. 541,746.

*To all whom it may concern:*

Be it known that I, HAROLD L. HAMILTON, a citizen of the United States, and a resident of Cleveland, in the county of Cuyahoga and State of Ohio, have invented a new and Improved Power Transmission, of which the following is a full, clear, and exact description.

This invention relates to improvements in power transmissions, an object of the invention being to provide a power transmission, in which a driving element is interposed between axles having drivers at the respective ends thereof and connect the ends of the driving element with both pairs of drivers, the connecting rods between the driving element and the drivers being connected to pins on the drivers, so as to utilize the four quarters of the circle, two quarters being utilized at one side of the transmission and the diametrically opposite quarters utilized at the other side of the transmission.

The invention relates more particularly to power transmission for electrically driven trucks or other motors, and resides in the provision of a drive shaft supported on the truck or frame independent of and preferably located midway between a pair of axles, each axle having drive wheels at its respective ends, and pins on the drive wheels arranged at different quarters with connecting rods connecting crank disks at the ends of the drive shaft with the drive wheels at the sides of the truck, the crank pins of the drivers at one side of the truck arranged ninety degrees, one in advance of the other, and the arrangement of crank pins and connecting means on the opposite sides of the truck being diametrically oppositely arranged, whereby a maximum of continuously applied power is utilized and dead centers entirely overcome. With a construction of power transmission such as I employ, the arrangement of parts will insure a constant and even torque and a positive and full leverage throughout the complete circle as the method of timing employed consists in utilizing the four quarters of the circle, and by reason of this improved power transmission I am enabled to support the weight of the motor upon the truck or frame and not upon any single axle, so that the result accomplished is a uniform traction of all of the drivers.

With these and other objects in view the invention consists in certain novel features of construction, and combinations and arrangements of parts, as will be more fully hereinafter described and pointed out in the claims.

In the accompanying drawings—

Figure 1 is a view in side elevation illustrating my improved power transmission applied to a truck of the electrically driven type.

Figure 2 is a top plan view of the truck partly in section.

1 and 2 represent axles supporting the frame 3 of the truck. Each of these axles is provided at its ends with rigidly secured or fixed drive wheels, and for clearness of description, I have given these drive wheels different reference characters.

The driving wheels on axle 1 are indicated by the reference numerals 4 and 5 respectively and the driving wheels on the axle 2 are indicated by reference numerals 6 and 7 respectively, the driving wheels 4 and 6 being on one side of the truck and the driving wheels 5 and 7 on the opposite sides thereof.

On the frame 3 at the center of the truck I mount a jackshaft 8, which constitutes a drive shaft for the truck and transmit power to this drive shaft through the medium of a motor 9, motor shaft 10 and gearing 11. This motor 9 may constitute an electric motor, or it may be any other form of drive, although my invention is particularly adapted for motors such as are commonly employed on electric cars.

Crank disks 12 and 13 are rigidly secured to the respective ends of drive shaft 8. The crank wheel or disk 13 is provided with a crank pin 14, to which an arm 15 is rigidly secured or otherwise affixed, and carries a crank pin 16 which is located at an angle of ninety degrees or one-quarter of the circle of the disk 13.

It is to be understood that the disk 13, crank pin 14, arm 15 and crank pin 16 have rigid relationship and that the arm 15 does not function as a crank arm, but merely operates to maintain the crank pin 16 in proper position with relation to the crank pin 14 and the other parts of the mechanism, and is necessarily offset from the outer face of the disk 13 to permit the operation of the transmission, as will more fully hereinafter appear.

A connecting rod 17 connects the crank pin 14 with a crank pin 18 on the forward drive wheel 7, while the crank pin 16 is connected by a connecting rod 19 with a crank pin 20 on the rear drive wheel 5. It will be noted that the crank pin 18 is located at a position one-quarter or ninety degrees in advance of the location of crank pin 20.

On the opposite side of the truck I provide an exact duplication of parts connecting the drive disk 12 with the drive wheel 6 but arranged in a diametrically opposite position to the connecting mechanism above described, and to clarify the description I shall give these parts on the opposite side of the truck different reference numerals.

The disk 12 has a crank pin 21 fixed thereto with a fixed arm 22 on the crank pin, and said arm 22 has a crank pin 23. A connecting rod 24 connects the pin 23 with a crank pin 25 on the rear drive wheel 4, and a connecting rod 26 connects the crank pin 21 with a crank pin 27 on the forward drive wheel 6.

By reference to Figure 1, it will be noted that the crank pins having fixed relation to the disks 12 are arranged on the four quarters of the circle, two of said crank pins being on one disk and the other two on the other disk, so that the power of the connecting rods is oppositely applied at the respective sides of the truck.

It will also be noted by reference to Figure 1 that when the connecting rod 17 is at a dead center position, the connecting rod 24 on the other side of the truck will also be at a dead center position, but the connecting rods 26 and 19 are in full power position either in thrust or in draft. Hence, it will be noted that with a structure or mechanism as above described a complete dead center of power transmission is never had, or, in other words, in every position of the several connecting rods at least two are always in full power position and at other times all four of the connecting rods are in power position. It is only at the instant indicated in Figure 1 that two of connecting rods are over dead center position, but the other pair of connecting rods being in full power position overcomes any tendency to dead center.

By reason of this construction a complete continuous transmission of power is had at all times, overcoming sudden jerks and thrusts past central position which might tend to injure the crank pin, and a continuous power is had which resists vibration and jolts to a minimum.

Furthermore, I would call attention to the fact that the driving element consisting of the shaft 8 and disks 12 together with the motor for driving the same, is located or supported by the truck at an intermediate position with the weight thereof evenly distributed upon the four drive wheels, so that the traction of all the drive wheels are alike.

In ordinary electrically driven motor constructions in common use the weight of the motor is upon one axle, so that the traction of the drive wheels of this axle is very much greater than the other wheels of the truck, and I, therefore, not only provide a superior power transmitting means, but I also, by reason of said transmitting means, provide improved traction with correspondingly improved results.

With this type of drive the unsprung weight has been reduced to a minimum, as the motor, transmission, jack-shaft, frame, and entire power assembly is carried in the frame and above the springs, whereas in the common accepted practice the final drive with motors and gearing are all attached direct to the driving axle shaft, thus being a dead weight on the rails, and the results of this tremendous unsprung weight in that type of final drive is notorious, and it was to get away from this bad feature, among other things, that my final drive was designed.

Various slight changes might be made in the general form and arrangement of the parts described without departing from the invention, and hence I do not limit myself to the precise details set forth, but consider myself at liberty to make such changes and alterations as fairly fall within the spirit and scope of the appended claims.

I claim:

1. A power transmission mechanism, comprising a rotary driving element, two pairs of driven elements, and connecting rods connecting the driving element with the respective driven elements, said connecting rods having connection with the driving element and the driven elements at the four quarters of the respective elements.

2. A power transmission mechanism, comprising a rotary driving element, two pairs of driven elements, and connecting rods connecting the driving element with the respective driven elements, said connecting rods having connection with the driving element and the driven elements at the four quarters of the respective elements, the connecting rods of one pair of driven elements arranged diametrically opposite to the position of the connecting rods of the other pair of elements.

3. A power transmission mechanism, comprising a pair of axles, a frame supported on the axles, driving wheels secured to the axles, a driving element located intermediate of the axles and supporting crank pins in pairs, one pair located at one end of the driving element and the other pair at the other end of the driving element, said pairs of crank pins disposed diametrically opposite to each other and the respective pins located at the four quarters of the driving element, crank pins on the wheels, and connecting rods connecting the crank pins of the driving element with the crank pins of the wheels, said crank pins of the wheels being disposed correspondingly with the crank pins of the driving element, whereby the crank pins of the driving wheels are located respectively at the four quarters of the circle.

4. The combination with a truck, a pair of axles supporting the truck, drive wheels secured to the axles at opposite sides of the truck, of a drive shaft supported on the truck between the axles, disks on the ends of the drive shaft, a pair of crank pins having fixed relation to each disk and spaced apart a distance of ninety degrees, the pins on one disk being located diametrically opposite to the pins on the other disk, whereby the four pins on the disks are spaced equally on the quarters of a circle, crank pins on the drive wheels, and connecting rods connecting the respective crank pins of the disk with said crank pins of the drive wheel.

5. The combination with a truck, a pair of axles supporting the truck, drive wheels secured to the axles at opposite sides of the truck, of a drive shaft supported on the truck between the axles, disks on the ends of the drive shaft, a pair of crank pins having fixed relation to each disk and spaced apart a distance of ninety degrees, the pins on one disk being located diametrically opposite to the pins on the other disk, whereby the four pins on the disks are spaced equally on the quarters of a circle, crank pins on the drive wheels, and connecting rods connecting the respective crank pins of the disk with said crank pins of the drive wheel, all of said connecting rods being of the same length, whereby the crank pins of the set of drive wheels are arranged at the four corners of the circle.

6. The combination with a truck, a pair of axles suporting the truck, and drive wheels at the ends of both axles, of a motor driven drive shaft supported on the truck between the axles, disks on the ends of the drive shaft, crank pins on the disks, arms fixedly connected to the crank pins, crank pins on the arms, each of said disks having one pair of crank pins, and the four crank pins of the two disks arranged at the four quarters of a circle, crank pins on the drive wheels, and connecting rods of equal length connecting the crank pins of the disks and arms with the crank pins of the drive wheels.

7. The combination with a truck, a pair of axles suporting the truck, and drive wheels on the axles, of power transmission means on the truck between the axles, and connecting rods connecting the transmission means with the drive wheels, whereby the connecting rod connections both with the transmission means and the drive wheels comprise a circular series at the four quarters of a circle.

HAROLD LOUIS HAMILTON.